Patented July 16, 1946

2,403,906

UNITED STATES PATENT OFFICE 2,403,906

TREATMENT OF KERATINOUS MATERIAL

William James Burke, Marshallton, Del., assignor to E. I. du Pont de Nemours & Company, Wilmington, Del., a corporation of Delaware No Drawing. Application June 6, 1944,
Serial No. 539,037

6 Claims. (Cl. 8—127.6)

This invention relates to the modification of keratinous materials, particularly wool or hair, with a monomeric-N-(acylthiomethyl) amide.

A keratinous material, e. g., wool or hair, which has been treated with an agent capable of rupturing disulfide linkages acquires certain desirable characteristics such as shrinkproofness, susceptibility to permanent set, and sensitivity to alkali. Inorganic sulfides, sulfites and cyanides have been used for this purpose but are known to degrade the keratinous material. Certain mercaptans have been suggested as treating agents in alkaline solution, but their toxicity, volatility, insolubility in water, and disagreeable odor limit their usefulness. Thioglycolic acid is known to convert the disulfide groups in wool to sulfhydryl groups but has the disadvantage of being strongly acid and therefore corrosive to metal equipment. Furthermore, wool or hair treated with this compound acquires an unpleasant odor.

This invention has as an object the provision of a process for modifying the physical and chemical properties of keratinous materials. A further object is a process for reducing the shrinkage tendency and increasing the reactivity toward alkali of keratinous materials, in particular wool. A still further object is a process for permanently setting hair, e. g., permanently waving, curling, or dekinking hair. Another object is to provide a wool which contains sulfhydryl groups and which does not have disagreeable odor characteristics. Other objects will appear hereinafter.

These objects are accomplished by the following invention wherein a keratinous material, in particular wool or hair, is treated with a solution prepared by dissolving a monomeric N-(acylthiomethyl) carbonamide in an alkaline solution and adjusting the pH to a value of four to nine, until a substantial proportion, preferably at least about 25%, of the disulfide groups of said keratinous material have been converted to sulfhydryl groups.

In the preferred method of carrying out the process of this invention, a monomeric N-(acylthiomethyl) carbonamide is dissolved in an aqueous alkaline solution and the pH of the solution adjusted to within the range of pH 5.0 to 6.5 by the addition of a weak acid, and wool fabric is immersed in this solution. The solution may be further buffered if desired by addition of, for example, citric acid and disodium phosphate. The reaction is then allowed to proceed for a period of one to twenty-four hours at a temperature of 15–35° C. The reaction is interrupted at any desired degree of completion as indicated by a quantitative analysis of the number of disulfide groups which have been converted to sulfhydryl groups. The product is washed with a suitable solvent such as water and/or alcohol and then dried in the air.

The more detailed practice of the invention is illustrated by the following examples, wherein parts given are by weight. There are, of course, many forms of the invention other than these specific embodiments.

Example I

Ten parts of N,N'-bis(acetylthiomethyl) urea $(CH_3CO-SCH_2NH)_2CO$, prepared in accordance with Example I of Burke Serial No. 524,623 filed March 1, 1944, is added with stirring to 70 parts of 5% aqueous sodium hydroxide at 35–40° C. The resulting solution is diluted with 15 parts of water, and acetic acid is added dropwise until the pH is 5.3.

Scoured wool yarn is suspended in this solution for six hours at 25° C., then washed successively with water and methanol and air dried. The treated yarn gives a strong positive sodium nitroprusside test for thiols and is much more soluble in 2% aqueous sodium hydroxide at 25° C. than the untreated wool.

Example II

A treating solution is prepared as described in Example I with the exception that only sufficient acetic acid is added to bring the pH of this solution to 8.8.

Scoured wool yarn is suspended in this solution for six hours at 25° C., washed thoroughly with methanol and water and air dried. The treated wool gives a strong positive test for thiols and is much more soluble in aqueous alkali than untreated wool.

Example III

To ten parts of N,N'-bis(acetylthiomethyl) urea dissolved in 75 parts of 5% aqueous sodium hydroxide at 25° C. is added sufficient 50% aqueous acetic acid to bring the pH of the solution to 5.6.

Scoured wool flannel is suspended in this solution at 25° C. for 18 hours and then washed thoroughly with water and methanol. The resulting flannel gives a strong sodium nitroprusside test for free thiol groups, and is much more sensitive to aqueous alkali than untreated wool flannel.

The reduced wool flannel prepared as described above is washed with water and suspended in a solution containing 10 parts of trimethylene dibromide, 75 parts of ethanol, 5 parts of ammonium chloride, 10 parts of water and sufficient ammonium hydroxide to bring the pH of the solution to 8.0. After three days at 25° C., the flannel is removed from the solution and washed thoroughly with water and dried in air. The treated material gives a negative test for thiols and is much more resistant to dilute alkali than the original untreated wool flannel.

*Example IV*

Five parts of N,N'-bis(acetylthiomethyl)adipamide (CH₃COSCH₂NHCO(CH₂)₄CONHCH₂SCOCH₃)

prepared in accordance with Example II of Burke Serial No. 524,623 is added with stirring to 38 parts of methanol containing 1.75 parts of potassium hydroxide. The pH of the resulting solution is adjusted to 5.6 by addition of 50% aqueous acetic acid and ten parts of methanol is added. Scoured wool flannel is suspended in the above solution for 18 hours at room temperature. The resulting treated flannel gives a strong positive sodium nitroprusside test for thiols and is much more soluble in 5% aqueous sodium hydroxide than the original wool flannel.

Keratinous materials which may be used in the process of this invention include wool in the form of fibers, threads, yarns, fabrics, or wool waste; various types of animal hair such as camel hair, mohair, horsehair, cattle hair, hog bristles, human hair; and additional keratinous materials, for example, chicken feathers, fur, animal hoofs, horns, horn tips, etc.

An important application of the process described in this invention is the permanent waving or, alternatively, dekinking, of human hair and animal hair. Treatment of hair with a monomeric N-(acylthiomethyl)carbonamide dissolved in alkaline solution and the solution adjusted to a pH within the limits of 4.0 to 9.0 reduces the disulfide crosslinks in the keratin molecule to thiol groups. When reduced, the hair is more amenable to shaping than untreated hair because splitting of the disulfide crosslinks relieves stress in the keratin molecule. In order to obtain a permanent set, the reduced fiber is formed in any desired shape as by means of a curler, and while maintained in this shape, is subjected to an oxidizing or other crosslinking treatment to reform crosslinks between the keratin molecules. Suitable oxidizing treatments include heating the reduced, shaped fiber in the presence of air or oxygen or reaction with hydrogen peroxide solutions. Suitable crosslinking reagents include alkylene dihalides, dibasic acid chlorides, etc. The recrosslinked hair retains the shape in which it was formed prior to the crosslinking treatment, whereas untreated hair, subjected to the same shaping treatment, does not retain a permanent set. By treating hair of undesired excessive curliness in a similar manner, employing a curler of reduced curliness, or even a hair retaining device having little or no curling effect, the curl may be reduced or even eliminated.

The monomeric N-(acylthiomethyl)carbonamides useful in the process of this invention are described in Burke Serial No. 524,623, filed March 1, 1944. The term "carbonamide" is used generically to include the oxygen carbonamides, containing the grouping

the thiocarbonamides, containing the grouping

and the iminocarbonamides (amidines) contain the grouping

They are prepared by reacting a monobasic thiolcarboxylic acid, for example, thiolacetic acid, with a monomeric N-oxymethylcarbonamide, for example, N,N'-bis(methoxymethyl)urea. The preferred compounds are those derived from a lower (one to seven carbon) aliphatic monobasic thiolcarboxylic acid, and a water soluble N-oxymethylcarbonamide since these agents can be used in aqueous systems. These compounds have at least one R—COSNH-group attached to an amide carbonyl group, where R is a lower aliphatic radical preferably hydrocarbon. In the most preferred compounds R is CH₃. In addition to those mentioned in the examples, the compounds useful in this invention include N-(acetylthiomethyl)-acetamide, N-(acetylthiomethyl)melamine, N-(butyrylthiomethyl)acetamide, N-(acetylthiomethyl)formamide, N-(acetylthiomethyl)urea, N-(acetylthiomethyl)thioformamide, N,N'-bis(acetylthiomethyl)uron, and tetrahydro-1,3-bis(acetylthiomethyl)-5-methyl-2(1)-s-triazone, and the like. The preferred N-(acylthiomethyl)-carbonamides are soluble in 5% aqueous sodium hydroxide to the extent of at least 3% at room temperature. In general, best results are obtained with N-(acylthiomethyl)amides derived from oxygen carbonamides.

In carrying out the process of this invention, at least one mol of the monomeric N-(acylthiomethyl)carbonamide per disulfide group in the wool or hair must be used in order to obtain substantial modification of the wool or hair. Higher proportions of the N-(acylthiomethyl)carbonamides are preferable since this shortens the reaction time. Ordinarily 20–50 mols of the N-(acylthiomethyl)carbonamides per disulfide linkage in the wool are used to obtain adequate alkali solubility of the wool and reduction in the shrinkage tendencies.

When the reaction is carried out in alkaline medium any alkaline agent giving the desired pH can be used, including inorganic or organic bases or basic salts, in combination, if desired, with suitable buffers. The nitrogen bases, for example, ammonia, alkylamines, e. g., diethylamine; hydroxyamines, e. g., mono-, di-, or tri-ethanolamines; and quaternary ammonium hydroxides are suitable.

In the preparation of treating solutions, the N-(acylthiomethyl)carbonamide is dissolved in an alkaline medium preferably at a temperature below 40° C., so that the resulting solution has a pH greater than 7.0. If desired, the pH can be reduced to a value of 7.0 or less by the addition of acid. Such basic, neutral, and acidic solutions are all capable of reducing the disulfide linkages of wool. In practice, solutions having a pH of four to nine are used since reduction occurs readily in this pH range and the reduced wool is less likely to be damaged by degradation. Best results are obtained with treating solutions having a pH between 5.0 and 6.5 since damage to the wool is reduced to a minimum or avoided completely under these conditions. When weak acids such as acetic acid are used to adjust the pH of the treating solution, no buffer is necessary to maintain the pH within the selected range. Stronger acids, for example, hydrochloric or phosphoric acids can also be used in which event it is sometimes desirable to include a buffer in the solution.

Any temperature of treating solution between 15° C. and 50° C. or even higher can be employed although the best results are obtained at 25–35° C. The reaction may be continued until substantially all of the disulfide linkages are reduced, as indicated by analysis for thiol groups. Ordinarily a period of 1–24 hours gives a practical degree of reaction, and in many instances 6–16 hours is sufficient.

The products produced by application to wool of the process of this invention are suitable for subsequent treatment with crosslinking agents such as organic and inorganic dihalides, metallic salts, and oxidizing agents and for use in the preparation of shrinkproof and alkali-resistant wool textiles. For example, wool reduced by treatment involving N-(acylthiomethyl)carbonamides can be reacted with any of the crosslinking agents in Salzberg application Serial No. 438,509, filed April 10, 1942, e. g., trimethylene dibromide, methylene iodide, methylene chloride, 1,5-dichloropentane, 1,16-dibromocetane, 1,3-dichlorobutane, 2-methyl-1,4-dichlorobutane, 1-chloro-3-bromopropane, 1-chloro-4-iodobutane, 1-bromo-2-iodoethane, etc. The products of this invention, and particularly those in which the conversion of disulfide linkages to sulfhydryl groups is substantially complete, are suitable for the preparation of solutions suitable for spinning fibers or casting films. The resulting shaped products can be crosslinked by treatment with oxygen or the crosslinking agents described above.

Treatments utilizing monomeric N-(acylthiomethyl)carbonamides produce an excellent reducing action on wool, and furthermore the resulting reduced wool is substantially undamaged since the reaction can be carried out at a pH near the isoelectric point of wool. The N-(acylthiomethyl)carbonamides have the advantage of being stable, odorless solids. A further advantage of this invention is the fact that wool or hair which has been treated to convert the disulfide groups to sulfhydryl groups does not at the same time acquire an objectionable odor as in processes using, for example, thioglycolic acid to accomplish this result. Another advantage of this invention is the fact that the treating compounds are readily prepared from inexpensive, readily available materials.

The above description and examples are intended to be illustrative only. Any modification of or variation therefrom which conforms to the spirit of the invention is intended to be included within the scope of the claims.

What is claimed is:

1. A process which comprises treating a keratinous material with a solution prepared by dissolving a monomeric N-(acylthiomethyl)carbonamide in an alkaline solution and adjusting the pH to within the range of 4.0 to 9.0.

2. A process which comprises treating a keratinous material with a solution prepared by dissolving a monomeric N-(acylthiomethyl)carbonamide in an aqueous alkaline solution and adjusting the pH to within the range of 4.0 to 9.0.

3. A process which comprises treating wool with a solution prepared by dissolving N,N'-bis(acetylthiomethyl)urea in an aqueous alkaline solution and regulating the pH to a value of 5.0 to 6.5, and continuing the treatment until a substantial proportion of the disulfide groups of the wool is converted to thiol groups.

4. A process which comprises treating wool in a solution prepared by dissolving a monomeric N-(acylthiomethyl)carbonamide in an aqueous alkaline solution, regulating the pH to a value of 5.0 to 6.5 and continuing the treatment until a substantial proportion of the disulfide groups of the wool is converted to thiol groups.

5. A process which comprises treating wool in a solution prepared by dissolving a monomeric N-(acylthiomethyl)carbonamide in an aqueous alkaline solution, regulating the pH to a value of 5.0 to 6.5 and continuing the treatment until at least 25% of the disulfide groups is converted to thiol groups.

6. The process of claim 5 wherein the acyl group of the N-(acylthiomethyl)carbonamide is that of a monobasic aliphatic carbothiolic acid of one to seven carbons.

WILLIAM JAMES BURKE.